United States Patent
Zeng

(10) Patent No.: US 10,552,178 B2
(45) Date of Patent: *Feb. 4, 2020

(54) METHOD FOR CONTROLLING STARTUP OF APPLICATION AND TERMINAL DEVICE

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,601

(22) Filed: Jan. 9, 2019

(65) Prior Publication Data

US 2019/0146813 A1 May 16, 2019

Related U.S. Application Data

(63) Continuation of application No. 16/110,315, filed on Aug. 23, 2018, which is a continuation-in-part of
(Continued)

(30) Foreign Application Priority Data

May 31, 2016 (CN) .......................... 2016 1 0380664

(51) Int. Cl.
  *G06F 9/46* (2006.01)
  *G06F 9/445* (2018.01)
  *G06F 9/50* (2006.01)

(52) U.S. Cl.
  CPC .......... *G06F 9/44578* (2013.01); *G06F 9/445* (2013.01); *G06F 9/5055* (2013.01);
(Continued)

(58) Field of Classification Search
  CPC ..... G06F 9/44578; G06F 9/445; G06F 9/5055
  See application file for complete search history.

(56) References Cited

U.S. PATENT DOCUMENTS 9,811,380 B1 * 11/2017 Martin ...................... G06F 9/50
2012/0084343 A1 * 4/2012 Mir .................. H04L 29/12066
  709/203
(Continued)

FOREIGN PATENT DOCUMENTS

CN      103077087 A    5/2013
CN      104133691 A    11/2014
(Continued)

OTHER PUBLICATIONS

International search report issued in corresponding international application No. PCT/CN2017/086538 dated Sep. 1, 2017.
(Continued)

*Primary Examiner* — Wissam Rashid
(74) *Attorney, Agent, or Firm* — Young Basile Hanlon & MacFarlane, P.C.

(57) ABSTRACT

A method for controlling application includes following operations. Startup of a target application of a terminal device is accelerated in response a control instruction of starting the target application. Accelerating the startup of the target application is stopped when a duration of accelerating the startup of the target application reaches a preset value, based on that a time length required for successfully starting the target application is greater than or equal to a preset time length, or accelerating the startup of the target application is stopped when a refresh rate of frames of a main thread of the target application reaches or exceeds a preset refresh rate, based on that the time length required for successfully starting the target application is less than the preset time length. A related terminal device is also provided.

15 Claims, 9 Drawing Sheets

Related U.S. Application Data application No. PCT/CN2017/086538, filed on May 31, 2017.

(52) U.S. Cl.
CPC .............. *G06F 9/505* (2013.01); *Y02D 10/22* (2018.01); *Y02D 10/36* (2018.01)

(56) References Cited

U.S. PATENT DOCUMENTS

| | | |
|---|---|---|
| 2014/0258702 A1 | 9/2014 | Freudenschuss et al. |
| 2014/0365808 A1* | 12/2014 | Deshmukh ................ G06F 1/12 713/375 |
| 2014/0380326 A1 | 12/2014 | Kurihara |

FOREIGN PATENT DOCUMENTS

| | | |
|---|---|---|
| CN | 104346226 A | 2/2015 |
| CN | 104360885 A | 2/2015 |
| CN | 104750519 A | 7/2015 |
| CN | 105389174 A | 3/2016 |
| CN | 105573768 A | 5/2016 |
| EP | 2530592 A2 | 12/2012 |

OTHER PUBLICATIONS

Extended European search report issued in corresponding European application No. 17805840.0 dated May 8, 2019.

\* cited by examiner

METHOD FOR CONTROLLING STARTUP OF APPLICATION AND TERMINAL DEVICE

CROSS-REFERENCE TO RELATED APPLICATION(S)

This application is continuation of U.S. application Ser. No. 16/110,315, filed on Aug. 23, 2018, which is continuation-in-part of International Application No. PCT/CN2017/086538, filed on May 31, 2017, which claims priority to Chinese Patent Application No. 201610380664.4, filed on May 31, 2016, the contents of all of which are hereby incorporated by reference in their entireties.

TECHNICAL FIELD

This disclosure relates to the technical field of terminal device, and particularly to a method for controlling application and a terminal device.

BACKGROUND

Among mainstream multi-core central processing unit (CPU) chip architectures of terminal devices, one architecture is a homogeneous architecture in which all cores are identical, and another architecture is a big-little core architecture consisted of two different cores. With regard to the big-little core CPU architecture, a high-performance CPU is referred as a big core, and a low-performance CPU is referred as a little core. A key principle of the big-little core CPU architecture is that the big core is invoked when big tasks are performed, and the little core is invoked when small tasks are performed, so as to conserve power of system. For an operating system of the big-little core CPU architecture, when a target application is started, the quicker the speed of starting the target application is, the better the user experience is.

SUMMARY

Embodiments of the present disclosure provide a method for controlling application and a related device.

In a first aspect, embodiments of the present disclosure provide a method for controlling application which includes following operations. A reference startup time length of a target application of a mobile terminal is obtained when a control instruction of starting the target application is detected. Startup of the target application is accelerated when the reference startup time length is greater than or equal to a preset time length. A reference percentage of idle resources of cores of the mobile terminal is obtained, and according to a pre-stored mapping relationship between accelerating startup time lengths of the target application and percentages of idle resources of the cores, an accelerating startup time length corresponding to the reference percentage of the idle resources of the cores is determined. The startup of the target application is accelerated based on a determination that a time length of accelerating the startup of the target application is greater than or equal to the accelerating startup time length. The reference percentage of the idle resources of the cores of the mobile terminal is obtained as follows. The reference percentage of the idle resources of the cores of the mobile terminal is determined according to m idle cores of n cores of the mobile terminal, or the reference percentage of the idle resources of the cores of the mobile terminal is determined according to the m idle cores of the n cores of the mobile terminal and a percentage of remaining idle resources of each of n-m running cores.

In a second aspect, embodiments of the present disclosure provide a mobile terminal. The mobile terminal includes a time length obtaining unit, a first accelerating startup unit, and a first accelerating stop unit. The time length obtaining unit is configured to obtain a reference startup time length of a target application of the mobile terminal when a control instruction of starting the target application of the mobile terminal is detected. The first accelerating startup unit is configured to accelerate startup of the target application when the reference startup time length is greater than or equal to a preset time length, obtain a reference percentage of idle resources of cores of the mobile terminal, and determine, according to a pre-stored mapping relationship between accelerating startup time lengths of the target application and percentages of idle resources of the cores, an accelerating startup time length corresponding to the reference percentage of the idle resources of the cores. The first accelerating stop unit is configured to stop accelerating the startup of the target application when a time length of accelerating the startup of the target application is greater than or equal to the accelerating startup time length. The first accelerating startup unit configured to obtain the reference percentage of the idle resources of the cores of the mobile terminal is configured to determine the reference percentage of the idle resources of the cores of the mobile terminal according to m idle cores of n cores of the mobile terminal, or determine the reference percentage of the idle resources of the cores of the mobile terminal according to the m idle cores of the n cores of the mobile terminal and a percentage of remaining idle resources of each of n-m running cores.

In a third aspect, embodiments of the present disclosure provide another terminal device. The terminal device includes at least one processor and a computer readable memory coupled to the at least one processor. The computer readable memory stores at least one computer executable instruction therein which, when executed by the at least one processor, causes the at least one processor to carry out following actions. A reference startup time length of a target application of a mobile terminal is obtained when a control instruction of starting the target application is detected. Startup of the target application is accelerated when the reference startup time length is greater than or equal to a preset time length. A reference percentage of idle resources of cores of the mobile terminal is obtained, and according to a pre-stored mapping relationship between accelerating startup time lengths of the target application and percentages of idle resources of the cores, an accelerating startup time length corresponding to the reference percentage of the idle resources of the cores is determined. The startup of the target application is accelerated based on a determination that a time length of accelerating the startup of the target application is greater than or equal to the accelerating startup time length. The reference percentage of the idle resources of the cores of the mobile terminal is obtained as follows. The reference percentage of the idle resources of the cores of the mobile terminal is determined according to m idle cores of n cores of the mobile terminal, or the reference percentage of the idle resources of the cores of the mobile terminal is determined according to the m idle cores of the n cores of the mobile terminal and a percentage of remaining idle resources of each of n-m running cores.

BRIEF DESCRIPTION OF DRAWINGS

To describe technical solutions in the embodiments of the present disclosure more clearly, the following briefly introduces the accompanying drawings required for describing the embodiments. Apparently, the accompanying drawings in the following description illustrate some embodiments of the present disclosure. A person ordinarily skilled in the art may also obtain other accompanying drawings based on these accompanying drawings without creative efforts.

DETAILED DESCRIPTION

Figure 1:
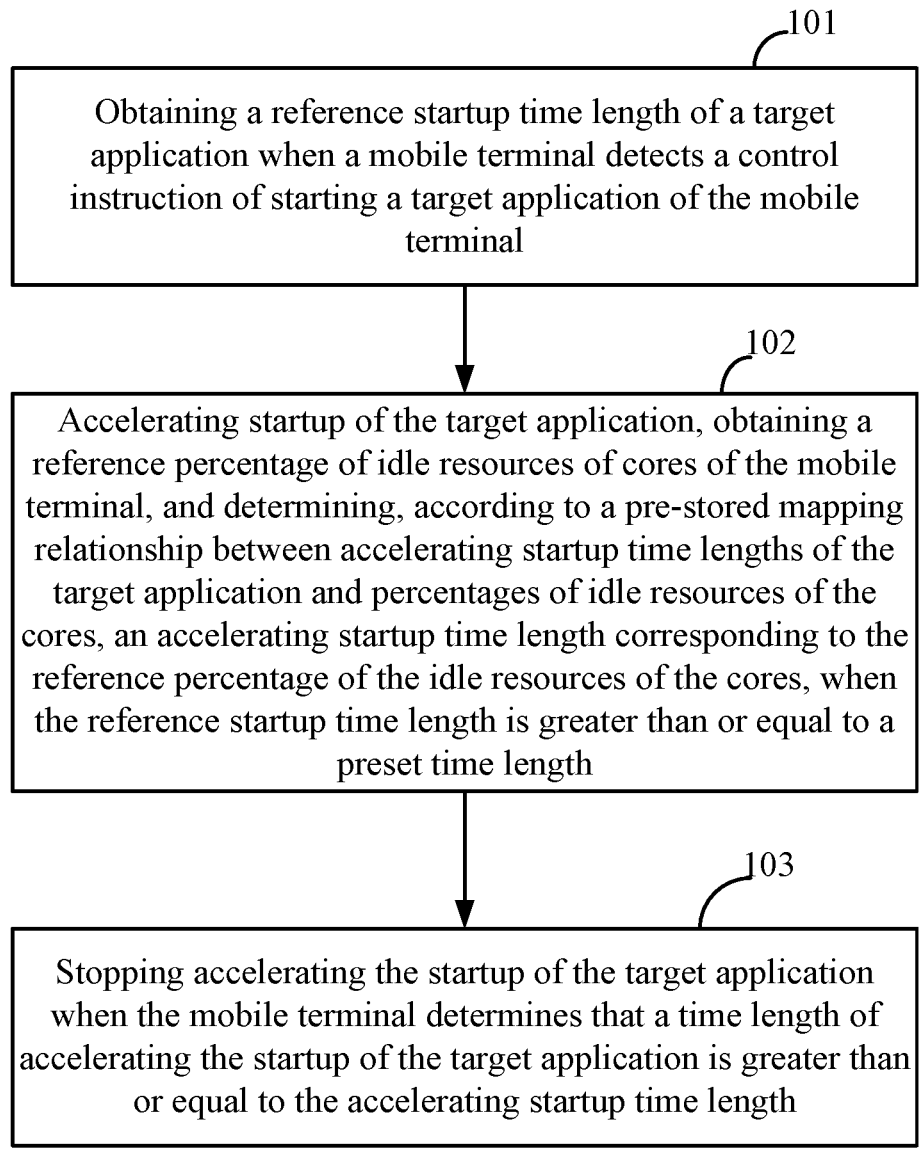
FIG. 1 is a schematic flow chart illustrating a method for controlling application according to an embodiment of the present disclosure.

In order to enable those skilled in the art to better understand solutions of the present disclosure, technical solutions in embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those ordinarily skilled in the art based on the embodiments of the present disclosure without creative efforts shall fall within the protection scope of the present disclosure.

The terms "first", "second" and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the embodiment may be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

To better understand a method for controlling application and a terminal device disclosed in the embodiments of the present disclosure, the following will illustrate the embodiments of the present disclosure in detail.

In an existing solution for accelerating startup of an application, when a target application is started, a terminal device may accelerate startup of the target application. However, a time length of the operation of accelerating startup is generally fixed, for example, the time length of the operation of accelerating startup is fixed to be two seconds. If a time length required for successfully starting the target application is one second, a waste of power consumption of the terminal device is caused by the operation of accelerating startup of one second. If the time length required for successfully starting the target application is ten seconds, since the terminal device just accelerates startup for two seconds, the actual time length of successfully starting the target application is not significantly reduced, and significant effect cannot be realized. In the method for controlling application provided by the embodiments of the present disclosure, by determining an accelerating startup time length of the target application, a stop time of accelerating the startup of the target application by the terminal device may be accurately controlled. The accelerating startup time length may be a duration of a finished operation of accelerating the startup of the target application. Compared with the existing solution in which the time length of the operation of accelerating startup is fixed, in the method of the present disclosure, the speed of starting an application of the terminal device is increased, and meanwhile the efficiency of managing resources of cores is optimized, and power consumption of the cores is reduced.

According to embodiments of the present disclosure, a method for controlling application is provided. The method is illustrated in FIG. 1. In FIG. 1, the method begins at block 101.

At block 101, when a mobile terminal detects a control instruction of starting a target application of the mobile terminal, the mobile terminal obtains a reference startup time length of the target application.

At block 102, when the reference startup time length is greater than or equal to a preset time length, the mobile terminal accelerates startup of the target application, obtains a reference percentage of idle resources of cores of the mobile terminal, and determines, according to a pre-stored mapping relationship between accelerating startup time lengths of the target application and percentages of idle resources of the cores, an accelerating startup time length corresponding to the reference percentage of the idle resources of the cores.

In one implementation, accelerating the startup of the target application includes the following. A work frequency of at least one core of the mobile terminal is adjusted to be a preset frequency. The target application is started via all idle resources of the cores of the mobile terminal.

At block 103, when the mobile terminal determines that a time length of accelerating the startup of the target application is greater than or equal to the accelerating startup time length, the mobile terminal stops accelerating the startup of the target application.

In one implementation, the reference percentage of the idle resources of the cores of the mobile terminal is determined according to m idle cores of n cores of the mobile terminal. In another implementation, the reference percentage of the idle resources of the cores of the mobile terminal is determined according to the m idle cores of the n cores of the mobile terminal and a percentage of remaining idle resources of each of n-m running cores.

The method may further include the following. The startup of the target application is accelerated based on a determination that the reference startup time length is less than the preset time length, and whether a refresh rate of frames of a main thread of the target application is greater than or equal to an accelerating stop refresh rate of the target application is determined. The startup of the target application is accelerated based on a determination that the refresh rate of the frames of the main thread of the target application is greater than the accelerating stop refresh rate.

In one implementation, the method further includes the following before the control instruction of starting the target application of the mobile terminal is detected. Multiple history records that the mobile terminal accelerated the startup of the target application are obtained, where each of the history records contains an accelerating startup time length of the target application and a percentage of idle resources of the cores of the mobile terminal, and the accelerating startup time length is greater than the preset time length. According to the multiple history records, an average time length of the accelerating startup time lengths contained in the multiple history records is determined to be the reference startup time length of the target application, and according to the multiple history records, the mapping relationship between accelerating startup time lengths of the target application and percentages of idle resources of the cores is determined.

In one implementation, the method further includes the following after stopping accelerating the startup of the target application. A work mode of at least one core of the mobile terminal is set to be a low power mode.

Figure 2:
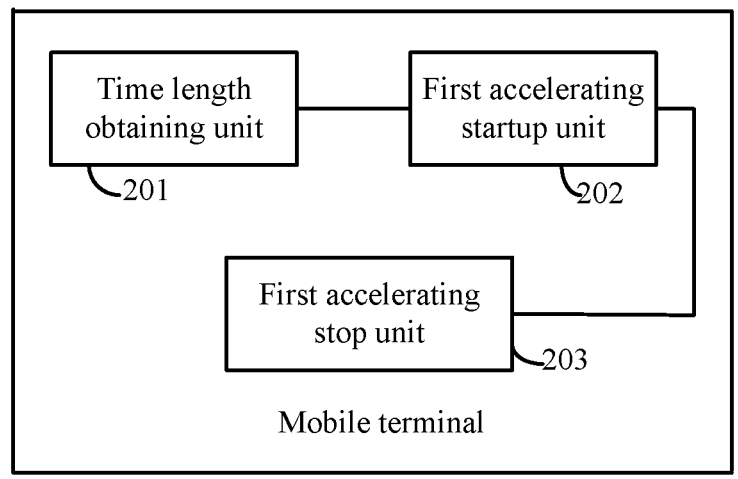
FIG. 2 is a functional block diagram illustrating a mobile terminal according to an embodiment of the present disclosure.

According to embodiments of the present disclosure, a mobile terminal configured to execute the method illustrated in FIG. 1 is provided. The mobile terminal is illustrated in FIG. 2 and includes a time length obtaining unit 201, a first accelerating startup unit 202, and a first accelerating stop unit 203.

The time length obtaining unit 201 is configured to obtain a reference startup time length of a target application of the mobile terminal when a control instruction of starting the target application of the mobile terminal is detected.

The first accelerating startup unit 202 is configured to accelerate startup of the target application when the reference startup time length is greater than or equal to a preset time length, to obtain a reference percentage of idle resources of cores of the mobile terminal, and to determine, according to a pre-stored mapping relationship between accelerating startup time lengths of the target application and percentages of idle resources of the cores, an accelerating startup time length corresponding to the reference percentage of the idle resources of the cores.

The first accelerating stop unit 203 is configured to stop accelerating the startup of the target application when a time length of accelerating the startup of the target application is greater than or equal to the accelerating startup time length.

In one implementation, the first accelerating startup unit 202 configured to obtain the reference percentage of the idle resources of the cores of the mobile terminal is configured to determine the reference percentage of the idle resources of the cores of the mobile terminal according to m idle cores of n cores of the mobile terminal, or to determine the reference percentage of the idle resources of the cores of the mobile terminal according to the m idle cores of the n cores of the mobile terminal and a percentage of remaining idle resources of each of n-m running cores.

Figure 3:
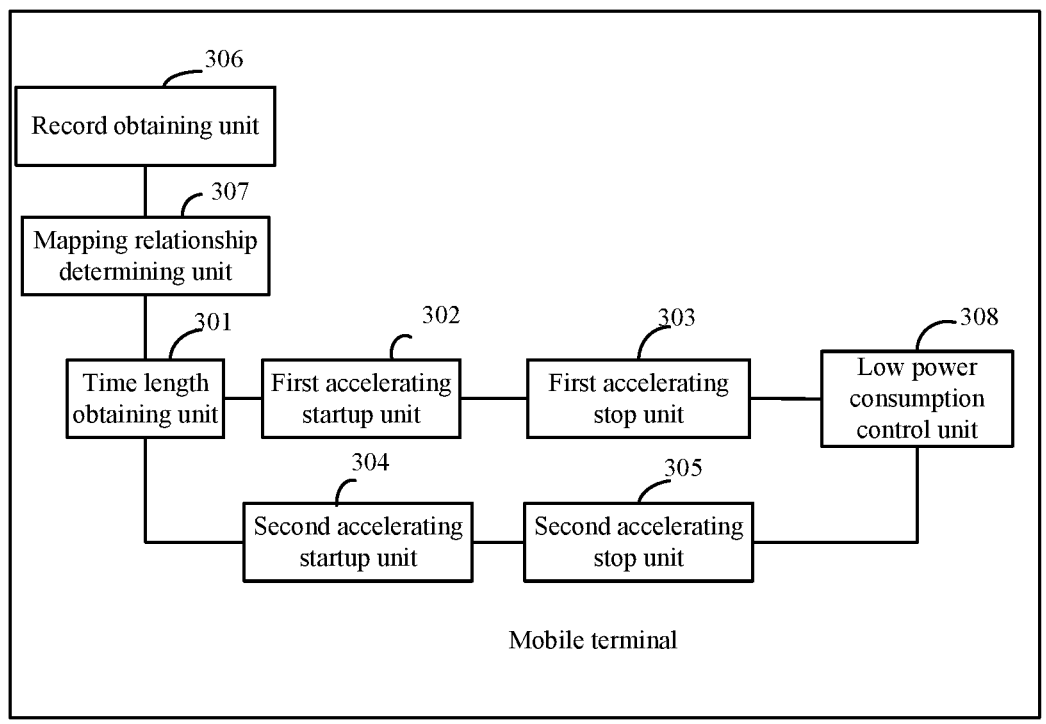
FIG. 3 is a functional block diagram illustrating another mobile terminal according to an embodiment of the present disclosure.

Referring to FIG. 3, in one implementation, another mobile terminal is further provided. Besides a time length obtaining unit 301, a first accelerating startup unit 302, and a first accelerating stop unit 303, the mobile terminal illustrated in FIG. 3 further includes a second accelerating startup unit 304 and a second accelerating stop unit 305. It is to be noted that the time length obtaining unit 301, the first accelerating startup unit 302, and the first accelerating stop unit 303 corresponds to the time length obtaining unit 201, the first accelerating startup unit 202, and the first accelerating stop unit 203, respectively, and will not be illustrated in detail.

The second accelerating startup unit 304 is configured to accelerate the startup of the target application when the reference startup time length is less than the preset time length, and determine whether a refresh rate of frames of a main thread of the target application is greater than or equal to an accelerating stop refresh rate of the target application.

The second accelerating stop unit 305 is configured to stop accelerating the startup of the target application when the refresh rate of the frames of the main thread of the target application is greater than the accelerating stop refresh rate.

In one implementation, the first accelerating startup unit 302 configured to accelerate the startup of the target application is configured to or the second accelerating startup unit 304 configured to accelerate the startup of the target application is configured to adjust a work frequency of at least one core of the mobile terminal to be a preset frequency, and start the target application via all idle resources of the cores of the mobile terminal.

In one implementation, the mobile terminal further includes a record obtaining unit 306 and a mapping relationship determining unit 307. The record obtaining unit 306 is configured to obtain multiple history records that the mobile terminal accelerated the startup of the target application, where each of the history records contains an accelerating startup time length of the target application and a percentage of idle resources of the cores of the mobile terminal, and the accelerating startup time length is greater than the preset time length.

The mapping relationship determining unit 307 is configured to determine, according to the multiple history records, an average time length of the accelerating startup time lengths contained in the multiple history records to be the reference startup time length of the target application, and determine, according to the multiple history records, the mapping relationship between accelerating startup time lengths of the target application and percentages of idle resources of the cores.

In one implementation, the mobile terminal further includes a low power consumption control unit 308 configured to set a work mode of at least one core of the mobile terminal to be a low power mode when the first accelerating stop unit 303 or the second accelerating stop unit 305 stops accelerating the startup of the target application.

It is to be noted that some details for the method illustrated in FIG. 1 and the mobile terminals respectively illustrated in FIG. 2 and FIG. 3 may be illustrated in detail in the following embodiments, thus herein some details are not elaborated. The following will illustrate some methods, devices for controlling applications, and terminal devices according to embodiments of the present disclosure in detail.

According to embodiments of the present disclosure, a method for controlling application is provided. The method includes following operations. Startup of a target application of a terminal device is accelerated in response to a control instruction of starting the target application. A percentage of current idle resources of cores of the terminal device is determined when a time length required for successfully starting the target application is greater than or equal to a preset time length, and according to a mapping relationship between accelerating startup time lengths of the target application and percentages of idle resources of the cores, an accelerating startup time length corresponding to the percentage of the current idle resources of the cores is determined, and each accelerating startup time length of the target application is a duration of a finished operation of accelerating the startup of the target application. Accelerating the startup of the target application is stopped based on a determination that a time length of accelerating the startup of the target application is greater than or equal to the accelerating startup time length corresponding to the percentage of the current idle resources of the cores.

In at least one implementation, the method further includes following operations. A refresh rate of frames of a main thread of the target application is monitored during the process of accelerating the startup of the target application, when the time length required for successfully starting the target application is less than the preset time length. Accelerating the startup of the target application is stopped based on that the refresh rate of the frames of the main thread of the target application reaches or exceeds a preset refresh rate.

In at least one implementation, the preset refresh rate is a maximum value of multiple history refresh rates of the frames of the main thread of the target application, and each of the history refresh rates was recorded by the terminal device at a time point that the target application was successfully started.

In at least one implementation manner, the preset refresh rate is an average value of multiple history refresh rates of the frames of the main thread of the target application, and each of the history refresh rates was recorded by the terminal device at a time point that the target application was successfully started.

In at least one implementation, the accelerating startup of the target application includes: increasing a work frequency of each of at least one of the cores of the terminal device; and starting the target application via all idle resources of the cores of the terminal device.

In at least one implementation, the time length required for successfully starting the target application is determined according to following acts: obtaining multiple history records that the terminal device accelerated the startup of the target application, where each of the history records contains an accelerating startup time length of the target application and a percentage of idle resources of the cores of the terminal device; and determining, according to the multiple history records, an average time length of the accelerating startup time lengths contained in the multiple history records to be the time length required for successfully starting the target application, and determining, according to the multiple history records, the mapping relationship between accelerating startup time lengths of the target application and percentages of idle resources of the cores.

In at least one implementation, after the stopping accelerating the startup of the target application, the method further includes: setting a work mode of each of at least one of the cores of the terminal device to be a low power mode.

In at least one implementation, the determining a percentage of current idle resources of cores of the terminal device includes: determining the percentage of the current idle resources of the cores according to m idle cores of n cores of the terminal device, m and n are integers, and m is less than n.

In at least one implementation, the determining a percentage of current idle resources of cores of the terminal device includes: determining the percentage of the current idle resources of the cores of the terminal device according to the m idle cores of the n cores of the terminal device and a percentage of remaining idle resources of each of n-m running cores.

According to embodiments of the present disclosure, a terminal device is provided. The terminal device includes at least one processor and a computer readable memory coupled to the at least one processor. The computer readable memory stores at least one computer executable instruction therein which, when executed by the at least one processor, causes the at least one processor to carry out following actions. Startup of a target application of the terminal device is accelerated in response to a control instruction of starting the target application. A percentage of current idle resources of cores of the terminal device is determined when a time length required for successfully starting the target application is greater than or equal to a preset time length, and according to a mapping relationship between accelerating startup time lengths of the target application and percentages of idle resources of the cores, an accelerating startup time length corresponding to the percentage of the current idle resources of the cores is determined, and each accelerating startup time length of the target application is a duration of a finished operation of accelerating the startup of the target application. Accelerating the startup of the target application is stopped based on a determination that a time length of accelerating the startup of the target application is greater than or equal to the accelerating startup time length corresponding to the percentage of the current idle resources of the cores.

According to embodiments of the present disclosure, another terminal device is provided. The terminal device includes at least one processor and a computer readable memory coupled to the at least one processor. The computer readable memory stores at least one computer executable instruction therein which, when executed by the at least one processor, causes the at least one processor to carry out following actions. Startup of a target application of the terminal device is accelerated in response to a control instruction of starting the target application. Accelerating the startup of the target application is stopped when a duration of accelerating the startup of the target application reaches a preset value, based on that a time length required for successfully starting the target application is greater than or equal to a preset time length, and accelerating the startup of the target application is stopped when a refresh rate of frames of a main thread of the target application reaches or exceeds a preset refresh rate, based on that the time length required for successfully starting the target application is less than the preset time length.

Figure 4:
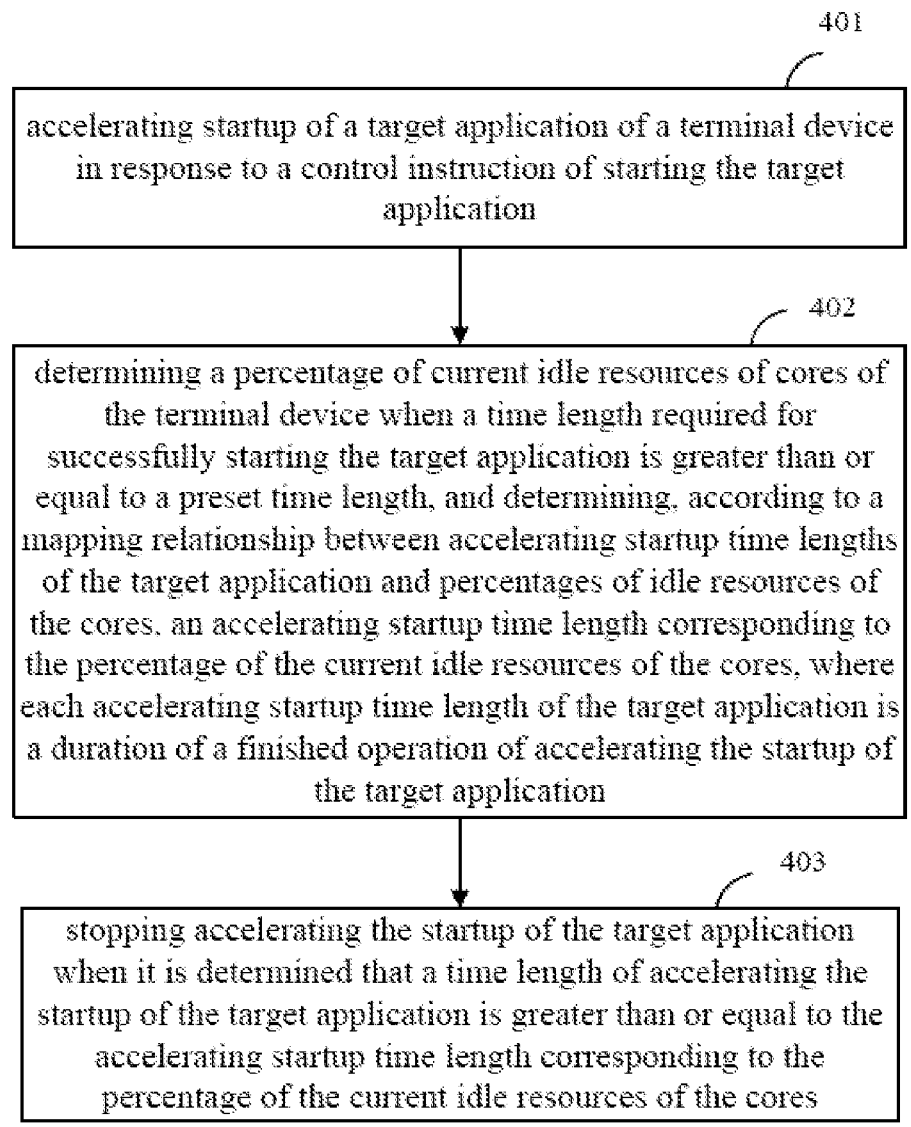
FIG. 4 is a schematic flow chart illustrating a method for controlling application according to an embodiment of the present disclosure.

Referring to FIG. 4, FIG. 4 illustrates a method for controlling application according to an embodiment of the present disclosure. As illustrated in the figure, the method begins at block 401.

At block 401, the terminal device accelerates startup of a target application of the terminal device in response to a control instruction of starting the target application.

The terminal device includes at least one high-performance core and at least one low-performance core (it shall be noted that herein high and low are relative, i.e., cores having different performances are referred). The at least one high-performance core and the at least one low-performance core constitute a big-little core architecture of the terminal device. The target application may be for example, any third-party application installed in the terminal device, or a system application.

The target application may be for example, a system application installed in the terminal device or a third-party application installed according to user requirements, for example a chatting application, a video playback application and so on. For example, the control instruction of starting the target application may be generated when the terminal device detects a selection operation performed on the target application by a user. The selection operation may be for example, a touch operation, a voice operation, and so on.

In at least one implementation, a manner in which the terminal device accelerates the startup of the target application may include following operations. The terminal device increases a work frequency of each of at least one of cores of the terminal device, and starts the target application via all idle resources of the cores of the terminal device. That is to say, the terminal device may increase a work frequency of one core or work frequencies of two or more cores of the terminal device to accelerate the startup of the target application. For example, the terminal device may adjust the work frequency of one core to approach or equal to a maximum work frequency of the core.

At block 402, the terminal device determines a percentage of current idle resources of the cores of the terminal device when a time length required for successfully starting the target application is greater than or equal to a preset time length, and determines, according to a mapping relationship between accelerating startup time lengths of the target application and percentages of idle resources of the cores, an accelerating startup time length corresponding to the percentage of the current idle resources of the cores. Each accelerating startup time length of the target application may be a duration of a finished operation of accelerating the startup of the target application. That is, each time the startup of the target application is accelerated, the duration of the operation of accelerating the startup of the target application may be recorded, and a percentage of idle resources of the cores at that point may be also recorded. In the mapping relationship, each accelerating startup time length of the target application corresponds to a percentage of idle resources of the cores. When the percentage of the current idle resources of the cores approaches (for example, 5% more than or less than) or equals to a percentage in the mapping relationship, the accelerating startup time length corresponding to the percentage in the mapping relationship is determined to be the accelerating startup time length corresponding to the percentage of the current idle resources of the cores. The mapping relationship may be stored in the terminal device in advance.

In the embodiment, the preset time length may be preset by user or may be system default. The time length required for successfully starting the target application may be for example, 1 second, 1.1 seconds, 1.2 seconds, 2 seconds, 3 seconds, 4 seconds, 4.1 seconds, and so on.

In at least one implementation, a manner in which the terminal device determines the percentage of the current idle resources of the cores of the terminal device may include the following operation. The terminal device determines the percentage of the current idle resources of the cores of the terminal device according to m idle cores of n cores of the terminal device, where m and n are integers, and m is less than n.

For example, it is assumed that the terminal device includes a hexadeca-core processor, the number of idle cores of the terminal device is eight, then the terminal device determines that the percentage of the current idle resources of the cores is 50%. Alternatively, the terminal device determines the percentage of the current idle resources of the cores according to the m idle cores of the n cores of the terminal device and a percentage of remaining idle resources of each of n-m running cores.

For example, it is assumed that the terminal device includes a octa-core processor, the number of idle cores of the terminal device is four, percentages of remaining idle resources of four running cores are 20%, 30%, 40%, and 5%, respectively, the terminal device determines that the percentage of the current idle resources of the cores is 61.875% calculated by dividing a sum of 80%, 70%, 60%, 95%, 1, 1, 1, and 1 by eight.

At block 403, when the terminal device determines that a time length of accelerating the startup of the target application is greater than or equal to the accelerating startup time length corresponding to the percentage of the current idle resources of the cores, the terminal device stops accelerating the startup of the target application.

It can be seen that in the method for controlling application according to the embodiment of the present disclosure, by determining the accelerating startup time length of the target application, a stop time of accelerating the startup of the target application by the terminal device may be accurately controlled. Comparing with the existing solution in which the time length of the operation of accelerating startup is fixed, in the method of the present disclosure, the speed of starting an application of the terminal device is increased, and meanwhile the efficiency of managing resources of the cores is optimized, and power consumption of the cores is reduced.

In at least one implementation, the terminal device further performs following operations. When the time length required for successfully starting the target application is less than the preset time length, the terminal device monitors a refresh rate of frames of a main thread of the target application during the process of accelerating the startup of the target application. When it is determined that the refresh rate of the frames of the main thread of the target application is greater than or equal to a preset refresh rate, the terminal device stops accelerating the startup of the target application.

The preset refresh rate may be a maximum value of multiple history refresh rates of the frames of the main thread of the target application, and each of the history refresh rates was recorded by the terminal device at a time point that the target application was successfully started. Alternatively, the preset refresh rate may be an average value of the multiple history refresh rates of the frames of the main thread of the target application. The preset refresh rate may be any value that is greater than or equal to 60 Hz, for example, 60 Hz, 61 Hz, 62 Hz, 65 Hz, 70 Hz, 75 Hz, and so on. It is to be understood that the history refresh rates recorded by the terminal device may be varied following startup of the target application, for example, some new refresh rates may be added, or some history refresh rates may be deleted from the terminal device. Thus, the preset refresh rate may be varied.

For an application scenario in which the time length of starting the target application is required to be short and the time length of accelerating the startup of the target application needs to be controlled more accurately, in the embodiment of the present disclosure, the refresh rate of the frames of the main thread of the target application is monitored during the process of accelerating the startup of the target application, and under a condition that the refresh rate of the frames of the main thread is greater than the preset refresh rate, accelerating the startup of the target application is stopped, thus the time length of accelerating the startup of the target application may be controlled more accurately, and a condition that the operation of accelerating startup is stilled performed when the terminal device has successfully started the target application may be avoided, which is advantageous to increase the speed of starting an application of the terminal device, optimize the efficiency of managing resources of cores, and reduce power consumption of cores.

In at least one implementation, the terminal device determines the time length required for successfully starting the target application according to the follows. The terminal device obtains multiple history records that the terminal device accelerated the startup of the target application. Each history record includes an accelerating startup time length of the target application and a percentage of idle resources of the cores of the terminal device. The accelerating startup time length may be greater than the preset time length. The terminal device determines, according to the multiple history records, an average time length of the accelerating startup time lengths contained in the multiple history records to be the time length required for successfully starting the target application, and determines, according to the multiple history records, the mapping relationship between the accelerating startup time lengths of the target application and percentages of idle resources of the cores.

In at least one implementation, after the terminal device stops accelerating the startup of the target application, the terminal device further performs the following operation. The terminal device sets a work mode of each of at least one of the cores of the terminal device to be a low power mode. That is to say, the work mode of one core or the work modes of two or more cores of the terminal device are set to be the low power mode.

The low power mode indicates a work mode of the terminal device based on a pre-stored scheme having minimum power consumption. The scheme having minimum power consumption may specifically include control parameters of the cores the terminal device, such as a parameter indicating a work frequency of a central processor, a parameter indicating the number of central processors that are run simultaneously and so on.

Figure 5:
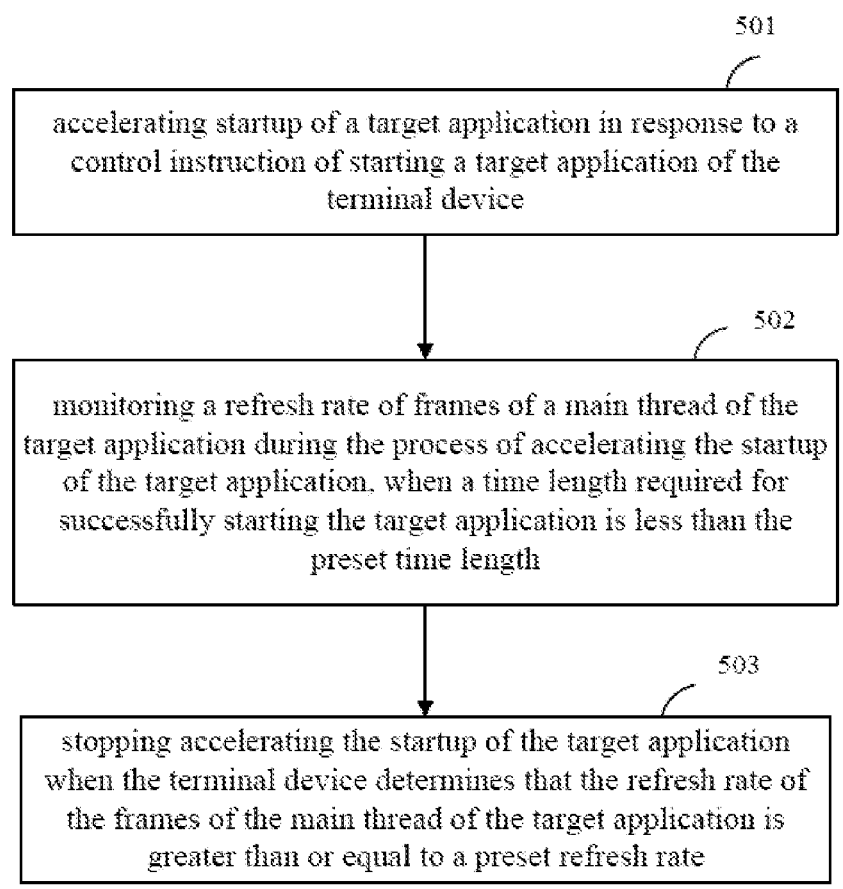
FIG. 5 is a schematic flow chart illustrating another method for controlling application according to an embodiment of the present disclosure.

In consistence with the above embodiment illustrated in FIG. 5, referring to FIG. 5, FIG. 5 is a schematic flow chart illustrating another method for controlling application according to an embodiment of the present disclosure. As illustrated in the figure, the method begins at block 501.

At block 501, the terminal device accelerates startup of a target application in response to a control instruction of starting a target application of the terminal device.

The terminal device includes at least one high-performance core and at least one low-performance core (it shall be noted that herein high and low are relative, i.e., cores having different performances are referred). The at least one high-performance core and the at least one low-performance core constitute a big-little core architecture of the terminal device. The target application may be for example, any third-party application installed in the terminal device, or a system application.

The target application may be for example, a system application installed in the terminal device or a third-party application installed according to user requirements, for example a chatting application, a video playback application and so on. For example, the control instruction of starting the target application may be generated when the terminal device detects a selection operation performed on the target application by a user. The selection operation may be for example, a touch operation, a voice operation, and so on.

At block 502, when a time length required for successfully starting the target application is less than the preset time length, the terminal device monitors a refresh rate of frames of a main thread of the target application during the process of accelerating the startup of the target application.

At block 503, when the terminal device determines that the refresh rate of the frames of the main thread of the target application is greater than or equal to a preset refresh rate, the terminal device stops accelerating the startup of the target application.

The preset refresh rate may be a maximum value of multiple history refresh rates of the frames of the main thread of the target application, and each of the history refresh rates was recorded by the terminal device at a time point that the target application was successfully started. Alternatively, the preset refresh rate may be an average value of the multiple history refresh rates of the frames of the main thread of the target application. The preset refresh rate may be any value that is greater than or equal to 60 Hz, for example, 60 Hz, 61 Hz, 62 Hz, 65 Hz, 70 Hz, 75 Hz, and so on. It is to be understood that the history refresh rates recorded by the terminal device may be varied following startup of the target application, for example, some new refresh rates may be added, or some history refresh rates may be deleted from the terminal device. Thus, the preset refresh rate may be varied.

It can be seen that for an application scenario in which the time length of starting the target application is required to be short and the time length of accelerating the startup of the target application needs to be controlled more accurately, in the optional embodiment of the present disclosure, the refresh rate of the frames of the main thread of the target application is monitored during the process of accelerating the startup of the target application, and under a condition that the refresh rate of the frames of the main thread is greater than the preset refresh rate, accelerating the startup of the target application is stopped, thus the time length of accelerating the startup of the target application may be controlled more accurately, and a condition that the operation of accelerating startup is stilled performed when the terminal device has successfully started the target application may be avoided, which is advantageous to increase the speed of starting an application of the terminal device, optimize the efficiency of managing resources of the cores, and reduce power consumption of the cores.

Figure 6:
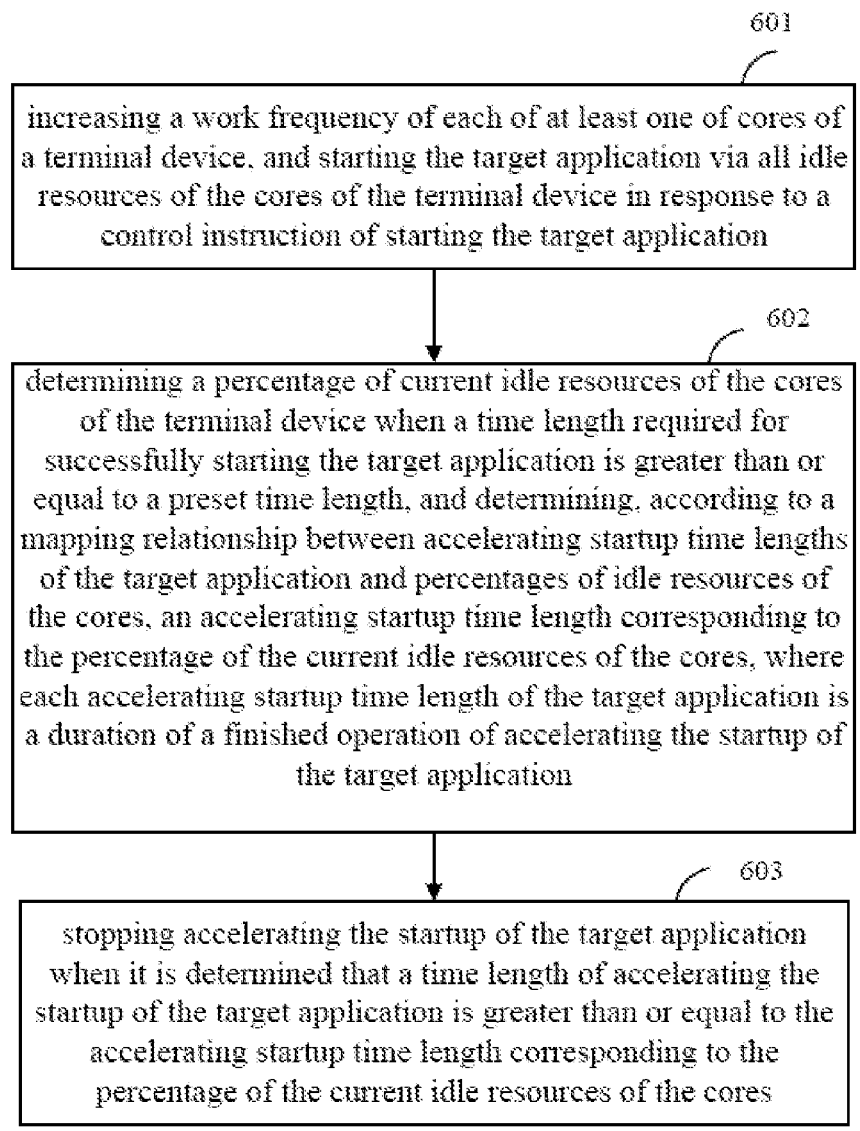
FIG. 6 is a schematic flow chart illustrating yet another method for controlling application according to an embodiment of the present disclosure.

In consistence with the embodiment illustrated in FIG. 4 and the embodiment illustrated in FIG. 5, referring to FIG. 6, FIG. 6 is a schematic flow chart illustrating yet another method for controlling application according to an embodiment of the present disclosure. As illustrated in the figure, the method begins at block 601.

At block 601, the terminal device, in response to a control instruction of starting a target application of the terminal device, increases a work frequency of each of at least one of cores of the terminal device, and starts the target application via all idle resources of the cores the terminal device to accelerate startup of the target application. That is to say, the terminal device may increase a work frequency of one core or work frequencies of two or more cores of the terminal device to accelerate the startup of the target application. For example, the terminal device may adjust the work frequency of one core to approach or equal to a maximum work frequency of the core.

The terminal device includes at least one high-performance core and at least one low-performance core (it shall be noted that herein high and low are relative, i.e., cores having different performances are referred). The at least one high-performance core and the at least one low-performance core constitute a big-little core architecture of the terminal device. The target application may be for example, any third-party application installed in the terminal device, or a system application.

The target application may be for example, a system application installed in the terminal device or a third-party application installed according to user requirements, for example a chatting application, a video playback application and so on. For example, the control instruction of starting the target application may be generated when the terminal device detects a selection operation performed on the target application by a user. The selection operation may be for example, a touch operation, a voice operation, and so on.

At block 602, when a time length required for successfully starting the target application is greater than or equal to a preset time length, the terminal device determines a percentage of current idle resources of the cores of the terminal device, and determines, according to a mapping relationship between accelerating startup time lengths of the target application and percentages of idle resources of the cores, an accelerating startup time length corresponding to the percentage of the current idle resources of the cores. Each accelerating startup time length of the target application may be a duration of a finished operation of accelerating the startup of the target application. That is, each time the startup of the target application is accelerated, the duration of the operation of accelerating the startup of the target application may be recorded, and the percentage of idle resources of the cores at that point may be recorded. In the mapping relationship, each accelerating startup time length of the target application corresponds to a percentage of idle resources of the cores. When the percentage of the current idle resources of the cores approaches (for example, 5% more than or less than) or equals to a percentage in the mapping relationship, the accelerating startup time length corresponding to the percentage in the mapping relationship is determined to be the accelerating startup time length corresponding to the percentage of the current idle resources of the cores. The mapping relationship may be stored in the terminal device in advance.

At block 603, when the terminal device determines that a time length of accelerating the startup of the target application is greater than or equal to the accelerating startup time length corresponding to the percentage of the current idle resources of the cores, the terminal device stops accelerating the startup of the target application.

It can be seen that in the method for controlling application according to the embodiment of the present disclosure, by determining the accelerating startup time length of the target application, a stop time of accelerating the startup of the target application by the terminal device may be accurately controlled. Comparing with the existing solution in which the time length of the operation of accelerating startup is fixed, in the method of the present disclosure, the speed of starting an application of the terminal device is increased, and meanwhile the efficiency of managing resources of the cores is optimized, and power consumption of the cores is reduced.

Figure 7:
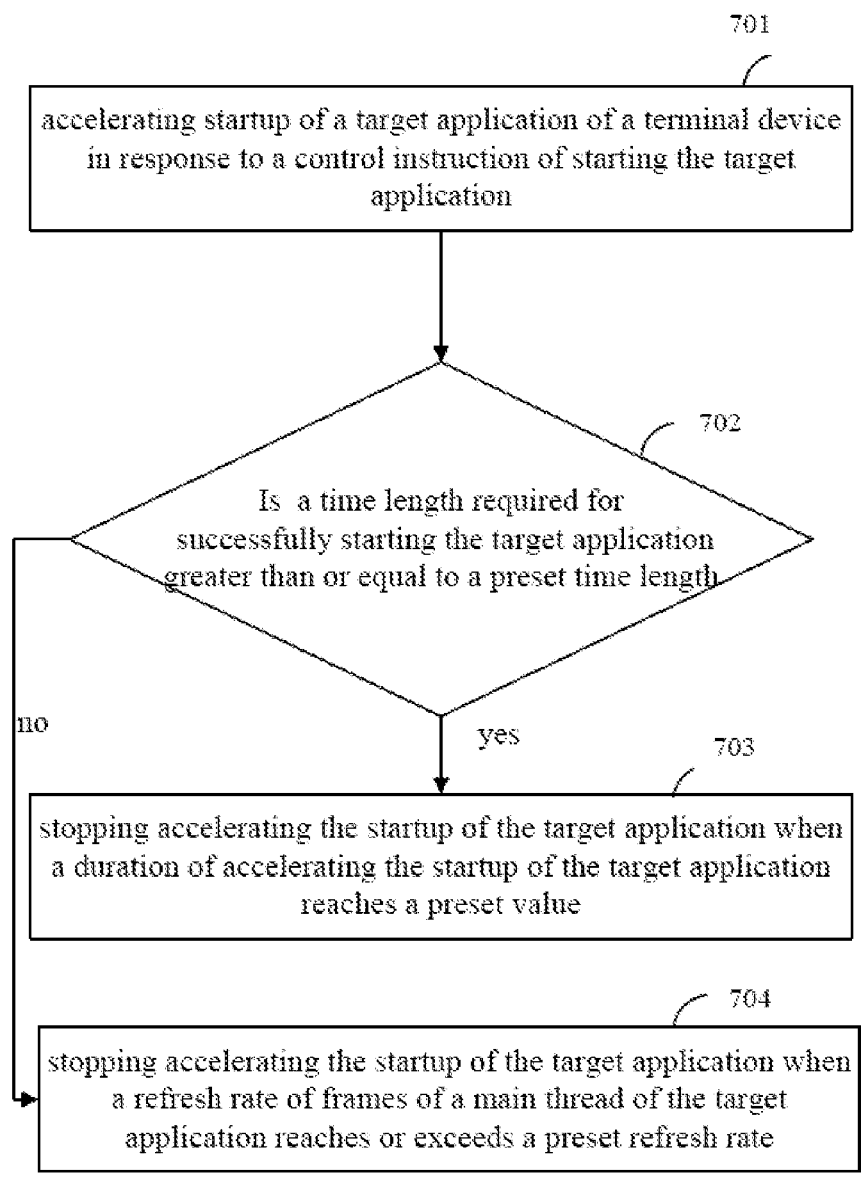
FIG. 7 is a schematic flow chart illustrating yet another method for controlling application according to an embodiment of the present disclosure.

FIG. 7 is a schematic flow chart illustrating yet another method for controlling application according to an embodiment of the present disclosure. The method begins at block 701.

At block 701, the terminal device accelerates startup of a target application of the terminal device in response to a control instruction of starting the target application. The operation at block 701 may correspond to the operation at block 401, and details will not be repeated herein.

At block 702, the terminal device determines whether a time length required for successfully starting the target application is greater than or equal to a preset time length. When the time length required for successfully starting the target application is greater than or equal to the preset time length, the procedure goes to block 703, otherwise, the procedure goes to block 704.

At block 703, the terminal device stops accelerating the startup of the target application when a duration of accelerating the startup of the target application reaches a preset value.

The preset value may be a duration of a finished operation of accelerating the startup of the target application. In an implementation, each time the startup of the target application is accelerated, the duration of the operation of accelerating the startup of the target application may be recorded, and a percentage of idle resources of cores of the terminal device at that point may be also recorded. When the target application is accelerated, the terminal device may select one of the recorded durations as the preset value according to a percentage of current idle resources of the cores of the terminal device and the recorded percentages of idle resources of the cores.

At block 704, the terminal device stops accelerating the startup of the target application when a refresh rate of frames of a main thread of the target application reaches or exceeds a preset refresh rate.

The preset refresh rate may be a maximum value of multiple history refresh rates of the frames of the main thread of the target application, and each of the history refresh rates was recorded by the terminal device at a time point that the target application was successfully started. Alternatively, the preset refresh rate may be an average value of the multiple history refresh rates of the frames of the main thread of the target application. The preset refresh rate may be any value that is greater than or equal to 60 Hz, for example, 60 Hz, 61 Hz, 62 Hz, 65 Hz, 70 Hz, 75 Hz, and so on. It is to be understood that the history refresh rates recorded by the terminal device may be varied following startup of the target application, for example, some new refresh rates may be added, or some history refresh rates may be deleted from the terminal device. Thus, the preset refresh rate may be varied.

By means of the method illustrated in FIG. 7, no matter whether the time length of starting the target application is long or short, stop accelerating the startup of the target application may be controlled accurately. Thus, the speed of starting an application of the terminal device is increased, the efficiency of managing resources of the cores is optimized, and power consumption of the cores is reduced.

Figure 8:
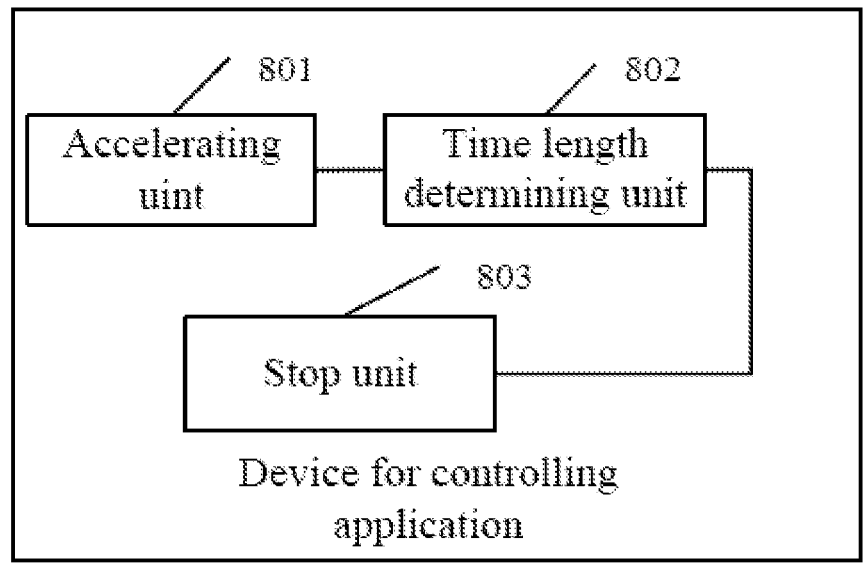
FIG. 8 is a functional block diagram illustrating a device for controlling application according to an embodiment of the present disclosure.
Figure 9:
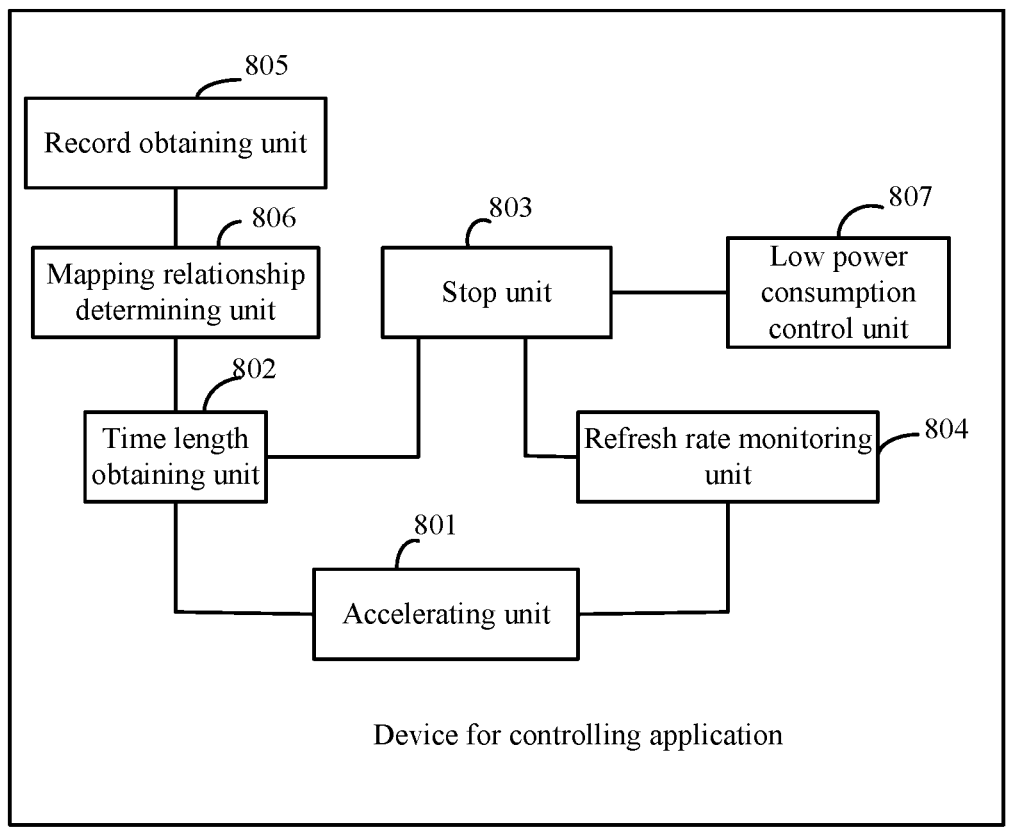
FIG. 9 is a functional block diagram illustrating another device for controlling application according to an embodiment of the present disclosure.

The following illustrates a device embodiment of the present disclosure. The device embodiment of the present disclosure is configured to perform the methods realized by the method embodiments of the present disclosure. As illustrated in FIG. 8, the device for controlling application may include an accelerating unit 801, a time length determining unit 802, and a stop unit 803.

The accelerating unit 801 may be configured to accelerate startup of a target application of the terminal device in response to a control instruction of starting the target application.

In at least one implementation, the accelerating unit 801 may be configured to increase a work frequency of each of at least one of cores of the terminal device, and start the target application via all idle resources of the cores of the terminal device to accelerate the startup of the target application. That is to say, the accelerating unit 801 may increase a work frequency of one core or work frequencies of two or more cores of the terminal device to accelerate the startup of the target application.

The time length determining unit 802 may be configured to determine a percentage of current idle resources of the cores of the terminal device when a time length required for successfully starting the target application is greater than or equal to a preset time length, and determine, according to a mapping relationship between accelerating startup time lengths of the target application and percentages of idle resources of the cores, an accelerating startup time length corresponding to the percentage of the current idle resources of the cores. Each accelerating startup time length of the target application may be a duration of a finished operation of accelerating the startup of the target application. That is, each time the startup of the target application is accelerated, the duration of the operation of accelerating the startup of the target application may be recorded, and the percentage of idle resources of the cores at that point may be also recorded. In the mapping relationship, each accelerating startup time length of the target application corresponds to a percentage of idle resources of the cores. When the percentage of the current idle resources of the cores approaches (for example, 5% more than or less than) or equals to a percentage in the mapping relationship, the accelerating startup time length corresponding to the percentage in the mapping relationship is determined to be the accelerating startup time length corresponding to the percentage of the current idle resources of the cores. The mapping relationship may be stored in the terminal device in advance.

In at least one implementation, the time length determining unit 802 may be configured to determine the percentage of the current idle resources of the cores of the terminal device according to m idle cores of n cores of the terminal device, where m and n are integers, and m is less than n. Alternatively, the time length determining unit 802 may be configured to determine the percentage of the current idle resources of the cores according to the m idle cores of the n cores of the terminal device and a percentage of remaining idle resources of each of n-m running cores.

The stop unit 803 may be configured to stop accelerating the startup of the target application when it is determined that a time length of accelerating the startup of the target application is greater than or equal to the accelerating startup time length corresponding to the percentage of the current idle resources of the cores.

As illustrated in FIG. 6, the device for controlling application may include the accelerating unit 801, the time length determining unit 802, and the stop unit 803 illustrated in FIG. 8. Furthermore, the terminal device may further include a refresh rate monitoring unit 804, a record obtaining unit 805, a mapping relationship determining unit 806, and a low power consumption control unit 807.

The refresh rate monitoring unit 804 may be configured to monitor a refresh rate of frames of a main thread of the target application during the process of accelerating the startup of the target application when the time length required for successfully starting the target application is less than the preset time length.

The stop unit 803 is further configured to stop accelerating the startup of the target application when it is determined that the refresh rate of the frames of the main thread of the target application is greater than or equal to a preset refresh rate.

The preset refresh rate may be a maximum value of multiple history refresh rates of the frames of the main thread of the target application, and each of the history refresh rates was recorded by the terminal device at a time point that the target application was successfully started. Alternatively, the preset refresh rate may be an average value of the multiple history refresh rates of the frames of the main thread of the target application. The preset refresh rate may be any value that is greater than or equal to 60 Hz, for example, 60 Hz, 61 Hz, 62 Hz, 65 Hz, 70 Hz, 75 Hz, and so on. It is to be understood that the history refresh rates recorded by the terminal device may be varied following startup of the target application, for example, some new refresh rates may be added, or some history refresh rates may be deleted from the terminal device. Thus, the preset refresh rate may be varied.

The record obtaining unit 805 may be configured to obtain multiple history records that the terminal device accelerated startup of the target application. Each of the history records contains an accelerating startup time length of the target application and a percentage of idle resources of the cores of the terminal device, and the accelerating startup time length may be greater than the preset time length.

The mapping relationship determining unit 806 may be configured to determine, according to the multiple history records, an average time length of the accelerating startup time lengths contained in the multiple history records to be the time length required for successfully starting the target application, and determine, according to the multiple history records, the mapping relationship between accelerating startup time lengths of the target application and percentages of idle resources of the cores.

The low power consumption control unit 807 may be configured to set a work mode of each of at least one of the cores of the terminal device to be a low power mode when the stop unit 803 stops accelerating the startup of the target application. That is to say, the work mode of one core or the work modes of two or more cores of the terminal device are set to be the low power mode.

It shall be noted that the device for controlling application illustrated in the device embodiment of the present disclosure is presented in the form of functional units. "Units" used herein shall be broadly understood as much as possible. Objects for realizing functions described in various "units" may be for example, an application-specific integrated circuit (ASIC), a single circuit, processors (shared, specified, or a set of chips) for performing one or more software or hardware programs, a memory, a combinational logic circuit, and/or other appropriate components for realizing the above functions.

Figure 10:
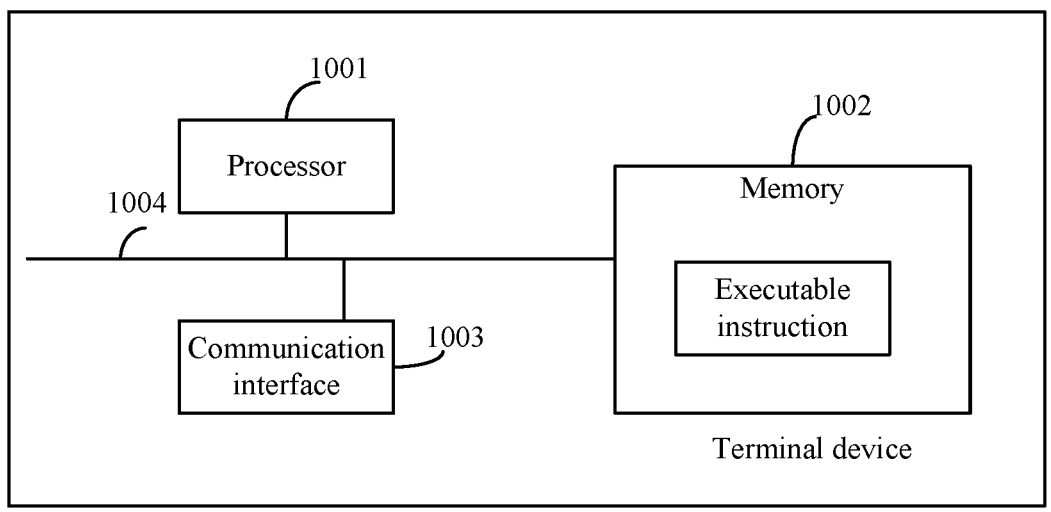
FIG. 10 is a schematic structural diagram illustrating a terminal device according to an embodiment of the present disclosure.

For example, the function that the accelerating unit 801 accelerates the startup of the target application may be realized by a terminal device illustrated in FIG. 10. Specifically, at least one processor 1001 invokes executable program codes (instructions) stored in a memory 1002 to accelerate the startup of the target application.

It can be seen that for the device for controlling application according to the embodiment of the present disclosure, by determining the accelerating startup time length of the target application, a stop time of accelerating the startup of the target application by the terminal device may be accurately controlled. Comparing with the existing solution in which the time length of the operation of accelerating startup is fixed, in the method of the present disclosure, the speed of starting an application of the terminal device is increased, and meanwhile the efficiency of managing resources of the cores is optimized, and power consumption of the cores is reduced.

Embodiments of the present disclosure further provide a terminal device. As illustrated in FIG. 10, the terminal device may include the at least one processor 1001 (hereinafter, the processor), the memory 1002, a communication interface 1003, and a communication bus 1004. The processor 1001, the memory 1002, and the communication interface 1003 can connect and communicate with each other via the communication bus 1004. The processor 1001 controls wireless communication with external cellular networks via the communication interface 1003. The processor 1001 includes at least one high frequency core and at least one low frequency core. The communication interface 1003 includes but is not limited to an antenna, an amplifier, a transceiver, a coupler, a low noise amplifier (LNA), a duplexer and the like. The memory 1002 may include at least one of following: a random access memory (RAM), a nonvolatile memory, and an external memory. The memory 1002 stores at least one executable instruction therein. When the at least one executable instruction in the memory 1002 is executed by the processor 1001, the processor 1001 is caused to carry out actions.

In at least one implementation, the processor 1001 is caused to accelerate startup of a target application of the terminal device in response to a control instruction of starting the target application, determine a percentage of current idle resources of cores of the terminal device when a time length required for successfully starting the target application is greater than or equal to a preset time length, and determine, according to a mapping relationship between accelerating startup time lengths of the target application and percentages of idle resources of the cores, an accelerating startup time length corresponding to the percentage of the current idle resources of the cores, where each accelerating startup time length of the target application is a duration of a finished operation of accelerating the startup of the target application. The processor 1001 is further caused to stop accelerating the startup of the target application when it is determined that a time length of accelerating the startup of the target application is greater than or equal to the accelerating startup time length corresponding to the percentage of the current idle resources of the cores.

It can be seen that for the terminal device according to the embodiment of the present disclosure, by determining the accelerating startup time length of the target application, a stop time of accelerating the startup of the target application by the terminal device may be accurately controlled. Comparing with the existing solution in which the time length of the operation of accelerating startup is fixed, in the device of the present disclosure, the speed of starting an application of the terminal device is increased, and meanwhile the efficiency of managing resources of the cores is optimized, and power consumption of the cores is reduced.

In at least one implementation, the processor 1001 is further caused to monitor a refresh rate of frames of a main thread of the target application during the process of accelerating the startup of the target application, when the time length required for successfully starting the target application is less than the preset time length, and stop accelerating the startup of the target application based on that the refresh rate of the frames of the main thread of the target application reaches or exceeds a preset refresh rate.

In at least one implementation, the preset refresh rate is an average value of multiple history refresh rates of the main thread of the target application, and each of the history refresh rates was recorded by the terminal device at a time point that the target application was successfully started.

In at least one implementation, the processor 1001 caused to accelerate the startup of the target application is caused to increase a work frequency of each of at least one of the cores of the terminal device, and start the target application via all idle resources of the cores of the terminal device.

In at least one implementation manner, the processor 1001 is further caused to obtain multiple history records that the terminal device accelerated the startup of the target application, where each of the history records contains an accelerating startup time length of the target application and a percentage of idle resources of the cores of the terminal device. The processor 1001 is further caused to determine, according to the multiple history records, an average time length of the accelerating startup time lengths contained in the multiple history records to be the time length required for successfully starting the target application, and determine, according to the multiple history records, the mapping relationship between accelerating startup time lengths of the target application and percentages of idle resources of the cores.

In at least one implementation, the processor 1001 is further caused to set a work mode of each of at least one of the cores of the terminal device to be a low power mode after stopping accelerating the startup of the target application.

In at least one implementation, the processor 1001 caused to determine the percentage of the current idle resources of the cores of the terminal device is caused to determine the percentage of the current idle resources of the cores according to m idle cores of n cores of the terminal device, where m and n are integers, and m is less than n.

In at least one implementation, the processor 1001 caused to determine the percentage of the current idle resources of the cores of the terminal device is caused to determine the percentage of the current idle resources of the cores of the terminal device according to the m idle cores of the n cores of the terminal device and a percentage of remaining idle resources of each of n-m running cores.

In at least one implementation, the processor 1001 is further caused to accelerate startup of the target application in response to a control instruction of starting a target application of the terminal device, stop accelerating the startup of the target application when a duration of accelerating the startup of the target application reaches or exceeds a preset value, based on that a time length required for successfully starting the target application is greater than or equal to a preset time length, and stop accelerating the startup of the target application when a refresh rate of frames of a main thread of the target application reaches or exceeds a preset refresh rate, based on that the time length required for successfully starting the target application is less than the preset time length.

It can be seen that no matter whether the time length of starting the target application is long or short, stop accelerating the startup of the target application may be controlled accurately. Thus, the speed of starting an application of the terminal device is increased, the efficiency of managing resources of the cores is optimized, and power consumption of the cores is reduced.

Figure 11:
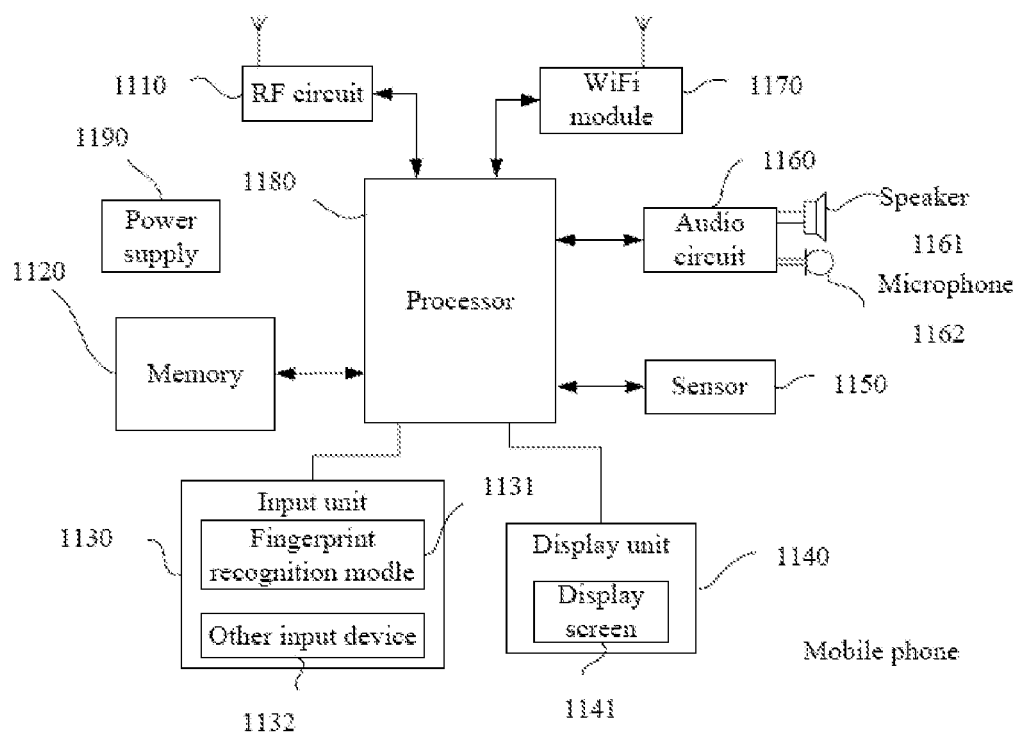
FIG. 11 is a schematic structural diagram illustrating another terminal device according to an embodiment of the present disclosure.

Embodiments of the present disclosure further provide another terminal device. As illustrated in FIG. 11, only parts related to the embodiment of the disclosure are illustrated for the convenience of description. For technical details not described, reference may be made to the method embodiments of the present disclosure. The terminal device may be any terminal device, such as a mobile phone, a tablet computer, a personal digital assistant (PDA), a point of sale terminal (POS), an on-board computer, and the like. The following describes a mobile phone as an example of the terminal device.

FIG. 11 is a block diagram illustrating a part of the structure of a mobile phone related to the terminal device according to an embodiment of the present disclosure. With reference to FIG. 11, the mobile phone may include a radio frequency (RF) circuit 1110, a memory 1120, an input unit 1130, a display unit 1140, a sensor 1150, an audio circuit 1160, a wireless fidelity (WiFi) module 1170, a processor 1180, a power supply 1190, and so on. Those skilled in the art can understand that the structure of the mobile phone illustrated in FIG. 11 does not constitute any limitation on a mobile phone. The mobile phone may include more or fewer components than illustrated, or may combine certain componentes or different components.

The following will specifically illustrate various components of the mobile phone in combination with FIG. 11.

The RF circuit 1110 is configured to receive and transmit information. Generally, the RF circuit 1110 includes but is not limited to an antenna, at least one amplifier, a transceiver, a coupler, a low noise amplifier (LNA), a duplexer and the like. In addition, the RF circuit 1110 may also communicate with the network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 1120 is configured to store software programs and modules, and the processor 1180 is configured to execute various function applications and data processing of the mobile phone by running the software programs and the modules stored in the memory 1120. The memory 1120 mainly includes a program storage area and a data storage area. The program storage area may store an operating system, application programs required for at least one function (for example, a function of obtaining a time length, a function of accelerating startup, and so on) and so on. The data storage area may store data (for example, a mapping relationship between accelerating startup time lengths and percentages of idle core resource, and so on) created according to use of the mobile phone, and so on. In addition, the memory 1120 may include a high-speed RAM, and may further include a non-volatile memory such as at least one disk storage device, a flash device, or other non-volatile solid storage devices.

The input unit 1130 may be configured to receive input digital or character information and generate key signal input associated with user setting and function control of the mobile phone. Specifically, the input unit 1130 may include a fingerprint recognition module 1131 and other input devices 1132. The fingerprint recognition module 1131 can collect data of fingerprint of a user thereon. Optionally, the fingerprint recognition module 1131 may include an optical fingerprint module, a capacitive fingerprint module, and a radio fingerprint module. Take the capacitive fingerprint recognition module as an example of the fingerprint recognition module 1131, the capacitive fingerprint recognition module specifically includes sensing electrodes (abnormal sensing electrodes and normal sensing electrodes) and signal processing circuits (such as an amplifying circuit, a noise suppression circuit, an analog-digital conversion circuit, and so on) connected to the sensing electrodes. In addition to the fingerprint recognition module 1131, the input unit 1130 may still include other input devices 1132. Specifically, the other input devices 1132 may include, but is not limited to, one or more of a physical keyboard, function keys (such as volume control buttons, switch buttons and so on), a trackball, a mouse, and a joystick.

The display unit 1140 is configured to display information input by the user or information provided for the user or various menus of the mobile phone. The display unit 1140 may include a display screen 1141, and alternatively, the display screen 1141 may be in the form of a liquid crystal display (LCD), an organic light-emitting diode (OLED) and so on. Although in FIG. 11, the fingerprint recognition module 1131 and the display screen 1141 are used as two separate components to realize the input and output functions of the mobile phone, in some embodiments, the fingerprint recognition module 1131 may be integrated with the display screen 1141 to implement the input and output functions of the mobile phone.

The mobile phone may also include at least one sensor 1150, such as a light sensor, a motion sensor, and other sensors. Specifically, the light sensor may include an ambient light sensor and a proximity sensor, and the ambient light sensor may adjust the brightness of the display screen 1141 according to ambient lights, and the proximity sensor may turn off the display screen 1141 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, which will not be repeated herein.

The audio circuit 1160, the speaker 1161, the microphone 1162 may provide an audio interface between the user and the mobile phone. The audio circuit 1160 may convert the received audio data into electrical signals and transfer the electrical signals to the speaker 1161; thereafter the speaker 1161 converts the electrical signals into sound signals to output. On the other hand, the microphone 1162 converts the received sound signals into electrical signals, which will be received and converted into audio data by the audio circuit 1160 to output. The audio data is then processed and transmitted by the processor 1180 via the RF circuit 1110 to another mobile phone for example, or, the audio data is output to the memory 1120 for further processing.

Wi-Fi belongs to a short-range wireless transmission technology. With aid of the Wi-Fi module 1170, the mobile phone may assist the user in E-mail receiving and sending, webpage browsing, access to streaming media and the like. Wi-Fi provides users with wireless broadband Internet access. Although the Wi-Fi module 1170 is illustrated in FIG. 11, the Wi-Fi module 1170 is not essential to the mobile phone and can be omitted according to actual needs without departing from the essential nature of the present disclosure.

The processor 1180 is the control center of the mobile phone, it connects various parts of the whole mobile phone through various interfaces and lines, runs or executes software programs and/or modules stored in the memory 1120, and invokes data stored in the memory 1120 to perform various functions of the mobile phone and process data, thereby monitoring the mobile phone as a whole. Optionally, the processor 1180 may include one or more processing units; for example, the processor 1180 may integrate an application processor and a modem processor, where the application processor handles the operating system, the user interface, the application, and so on, and the modem processor mainly processes wireless communication. It can be understood that the above-mentioned modem processor may not be integrated into the processor 1180.

The power supply 1190 (e.g., a battery) supplies power to various components. Preferably, the power supply may be logically connected to the processor 1180 via a power management system to enable management of charging, discharging, and power consumption through the power management system.

Although not illustrated, the mobile phone may further include a camera, a bluetooth module, and so on, which will not be repeated herein.

In the above embodiments, method processes in various steps may be realized based on the structure of the mobile phone.

In the above embodiments, functions of various units may be realized based on the structure of the mobile phone.

Embodiments of the present disclosure also provide a computer storage medium. The computer storage medium stores programs, and when the programs are executed, a part of or all of steps of any of the above methods for controlling application recorded in the above method embodiments can be realized.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, it can be understood that the apparatus disclosed in embodiments provided herein may be implemented in other manners. For example, the device/apparatus embodiments described above are merely illustrative; for instance, the division of the units is only a logical function division and there can be other manners of division during actual implementations, for example, multiple units or components may be combined or may be integrated into another system, or some features may be ignored, omitted, or not performed. In addition, coupling or direct coupling or communication connection among illustrated or discussed components may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory includes various medium capable of storing program codes, such as a universal serial bus (USB) flash disk, a read-only memory (ROM), a random-access memory (RAM), a movable hard disk, a disk, a compact disc (CD), and the like.

It will be understood by those ordinarily skilled in the art that all or a part of steps of the various methods of the embodiments described above may be accomplished by means of a program to instruct associated hardware, the program may be stored in a computer-readable memory, which may include a flash memory, a read-only memory (ROM), a random-access memory (RAM), a disk or a compact disc (CD), and so on.

The above illustrates the embodiments of the present disclosure in detail. The specification employs specific examples to illustrate the principle and implementation manners of the present disclosure. The illustration of the above embodiments is just used to help in understanding of the method and core concept of the present disclosure. Meanwhile, for a person ordinarily skilled in the art, depending on the concept of the present disclosure, changes may be made on the specific implementations and application range. In conclusion, the content of the specification shall not be understood to limit the present disclosure.

What is claimed is:

1. A method for controlling application, comprising:
   accelerating startup of a target application of a mobile terminal upon detecting a control instruction of starting the target application;
   when a time length required for successfully starting the target application is greater than or equal to a preset time length, determining a percentage of current idle cores of the mobile terminal, and determining, according to a pre-stored mapping relationship between accelerating startup time lengths of the target application and percentages of idle cores, an accelerating startup time length corresponding to the percentage of the current idle cores; and stopping accelerating the startup of the target application based on a determination that a time length of accelerating the startup of the target application is greater than or equal to the accelerating startup time length.

2. The method of claim 1, further comprising:
determining whether a refresh rate of frames of a main thread of the target application is greater than or equal to an accelerating stop refresh rate of the target application based on that the time length required for successfully starting the target application is less than the preset time length; and
stopping accelerating the startup of the target application based on a determination that the refresh rate of the frames of the main thread of the target application is greater than the accelerating stop refresh rate.

3. The method of claim 1, further comprising:
obtaining multiple history records that the mobile terminal accelerated the startup of the target application, wherein each of the history records contains an accelerating startup time length of the target application and a percentage of idle cores of the mobile terminal, and the accelerating startup time length is greater than the preset time length; and
determining, according to the multiple history records, an average time length of the accelerating startup time lengths contained in the multiple history records to be the time length required for successfully starting the target application, and determining, according to the multiple history records, the mapping relationship between accelerating startup time lengths of the target application and percentages of idle cores.

4. The method of claim 2, further comprising:
obtaining multiple history records that the mobile terminal accelerated the startup of the target application, wherein each of the history records contains an accelerating startup time length of the target application and a percentage of idle cores of the mobile terminal, and the accelerating startup time length is greater than the preset time length; and
determining, according to the multiple history records, an average time length of the accelerating startup time lengths contained in the multiple history records to be the time length required for successfully starting the target application, and determining, according to the multiple history records, the mapping relationship between accelerating startup time lengths of the target application and percentages of idle cores.

5. The method of claim 1, further comprising:
setting a work mode of at least one core of the mobile terminal to be a low power mode.

6. The method of claim 2, further comprising:
setting a work mode of at least one core of the mobile terminal to be a low power mode.

7. A non-transitory computer readable storage medium, being configured to store one or more programs;
the one or more programs, when executed, being operable with a processor to:
accelerate startup of a target application of a mobile terminal upon detecting a control instruction of starting the target application;
when a time length required for successfully starting the target application is greater than or equal to a preset time length, determine a percentage of current idle cores of the mobile terminal, and determine, according to a pre-stored mapping relationship between accelerating startup time lengths of the target application and percentages of idle cores, an accelerating startup time length corresponding to the percentage of the current idle cores; and
stop accelerating the startup of the target application when a time length of accelerating the startup of the target application is greater than or equal to the accelerating startup time length.

8. The non-transitory computer readable storage medium of claim 7, wherein the one or more programs are further operable with the processor to:
determine whether a refresh rate of frames of a main thread of the target application is greater than or equal to an accelerating stop refresh rate of the target application based on that the time length required for successfully starting the target application is less than the preset time length; and
stop accelerating the startup of the target application when the refresh rate of the frames of the main thread of the target application is greater than the accelerating stop refresh rate.

9. The non-transitory computer readable storage medium of claim 7, wherein the one or more programs are further operable with the processor to:
obtain multiple history records that the mobile terminal accelerated the startup of the target application, wherein each of the history records contains an accelerating startup time length of the target application and a percentage of idle cores of the mobile terminal, and the accelerating startup time length is greater than the preset time length; and
determine, according to the multiple history records, an average time length of the accelerating startup time lengths contained in the multiple history records to be the time length required for successfully starting the target application, and determine, according to the multiple history records, the mapping relationship between accelerating startup time lengths of the target application and percentages of idle cores.

10. The non-transitory computer readable storage medium of claim 7, wherein the one or more programs are further operable with the processor to:
set a work mode of at least one core of the mobile terminal to be a low power mode.

11. A mobile terminal comprising:
a processor;
a memory;
a communication interface; and
a communication bus;
the processor, the memory, and the communication interface being coupled with and communicating with each other via the communication bus;
the memory storing executable program codes;
the communication interface being configured for wireless communication;
the processor being configured to invoke the executable program codes in the memory to perform following acts:
accelerating startup of a target application of the mobile terminal upon detecting a control instruction of starting the target application;
when a time length required for successfully starting the target application is greater than or equal to a preset time length, determining a percentage of current idle cores of the mobile terminal, and determining, according to a pre-stored mapping relationship between accelerating startup time lengths of the target application and percentages of idle cores, an accelerating startup time length corresponding to the percentage of the current idle cores; and stopping accelerating the startup of the target application based on a determination that a time length of accelerating the startup of the target application is greater than or equal to the accelerating startup time length.

12. The mobile terminal of claim 11, wherein the processor is further configured to invoke the executable program codes in the memory to perform following acts:

determining whether a refresh rate of frames of a main thread of the target application is greater than or equal to an accelerating stop refresh rate of the target application based on that the time length required for successfully starting the target application is less than the preset time length; and stopping accelerating the startup of the target application based on a determination that the refresh rate of the frames of the main thread of the target application is greater than the accelerating stop refresh rate.

13. The mobile terminal of claim 11, wherein the processor is further configured to invoke the executable program codes in the memory to perform following acts:

obtaining multiple history records that the mobile terminal accelerated the startup of the target application, wherein each of the history records contains an accelerating startup time length of the target application and a percentage of idle cores of the mobile terminal, and the accelerating startup time length is greater than the preset time length; and determining, according to the multiple history records, an average time length of the accelerating startup time lengths contained in the multiple history records to be the time length required for successfully starting the target application, and determining, according to the multiple history records, the mapping relationship between accelerating startup time lengths of the target application and percentages of idle cores.

14. The mobile terminal of claim 12, wherein the processor is further configured to invoke the executable program codes in the memory to perform following acts:

obtaining multiple history records that the mobile terminal accelerated the startup of the target application, wherein each of the history records contains an accelerating startup time length of the target application and a percentage of idle cores of the mobile terminal, and the accelerating startup time length is greater than the preset time length; and determining, according to the multiple history records, an average time length of the accelerating startup time lengths contained in the multiple history records to be the time length required for successfully starting the target application, and determining, according to the multiple history records, the mapping relationship between accelerating startup time lengths of the target application and percentages of idle cores.

15. The mobile terminal of claim 11, wherein the processor is further configured to invoke the executable program codes in the memory to perform following acts:

setting a work mode of at least one core of the mobile terminal to be a low power mode.

* * * * *